US009488967B2

(12) United States Patent
Brady et al.

(10) Patent No.: US 9,488,967 B2
(45) Date of Patent: *Nov. 8, 2016

(54) CONFIGURING BUILDING ENERGY MANAGEMENT SYSTEMS USING KNOWLEDGE ENCODED IN BUILDING MANAGEMENT SYSTEM POINTS LISTS

(71) Applicant: International Business Machines Corporation, Armonk, NY (US)

(72) Inventors: Niall Brady, Donadea (IE); Freddy Lecue, Castleknock (IE); Anika Schumann, Mulhuddart (IE); Olivier Verscheure, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 418 days.

This patent is subject to a terminal disclaimer.

(21) Appl. No.: 13/711,012

(22) Filed: Dec. 11, 2012

(65) Prior Publication Data

US 2014/0163750 A1   Jun. 12, 2014

(51) Int. Cl.
 *G06F 1/26* (2006.01)
 *G05B 15/02* (2006.01)
 *G06Q 50/06* (2012.01)

(52) U.S. Cl.
 CPC ............... *G05B 15/02* (2013.01); *G06Q 50/06* (2013.01); *G05B 2219/2642* (2013.01)

(58) Field of Classification Search
 None
 See application file for complete search history.

(56) References Cited

U.S. PATENT DOCUMENTS

| | | | |
|---|---|---|---|
| 2003/0078677 | A1 | 4/2003 | Hull et al. |
| 2011/0055748 | A1* | 3/2011 | Vacariuc ................. 715/771 |
| 2011/0115816 | A1* | 5/2011 | Brackney ................. 345/629 |
| 2011/0276165 | A1* | 11/2011 | Ko .................. G06N 5/04 700/104 |
| 2012/0022700 | A1* | 1/2012 | Drees et al. ............. 700/276 |
| 2012/0179296 | A1* | 7/2012 | Han ............... G06Q 10/063 700/275 |
| 2014/0031958 | A1* | 1/2014 | Loganathan ...... G05B 19/4184 700/79 |

OTHER PUBLICATIONS

Q. Zhou et al., "A Model-Based Fault Detection and Diagnosis Strategy for HVAC Systems," International Journal of Energy Research, 33(10):903-918 (2009).

* cited by examiner

*Primary Examiner* — Sean Shechtman
(74) *Attorney, Agent, or Firm* — Kurt P. Goudy; Michael J. Chang, LLC (57) ABSTRACT

Techniques for configuring a Building Energy Management System (BEMS) using knowledge encoded in BMS point lists are provided. In one aspect, a method for configuring a BEMS of a site is provided. The method includes the following steps. A knowledge base is derived from subject matter expertise. The knowledge base is used to extract one or more building characteristics from a point list of a building management system (BMS) that are not directly available from the BMS point list. The BEMS is configured using the one or more building characteristics extracted from the BMS point list.

10 Claims, 7 Drawing Sheets

FIG. 1

| Status | Name/Label | Value | Units/States | Description | Location | Type |
|---|---|---|---|---|---|---|
| Normal | MA-T | 71 | deg F | Bldg 001 AHU 14 Mixed Air Temp | Metasys>RSTNAE1>N2-1>DX-87>MA-T | AI |
| Normal | RA-T | 66.1 | deg F | B001 Lobby AHU Return Air Temp | Metasys>RSTNAE1>N2-1>DX-40>RA-T | AI |

Metasys (Rochester)

| Status | Name/Label | Value | Units/States | Description | Location | Type |
|---|---|---|---|---|---|---|
| Normal | MA-T | 71 | deg F | Bldg 001 AHU 14 Mixed Air Temp | Metasys>RSTNAE1> N2-1>DX-87>MA-T | AI |
| Normal | RA-T | 66.1 | deg F | B001 Lobby AHU Return Air Temp | Metasys>RSTNAE1> N2-1>DX-40>RA-T | AI |

TrendIQ (Dublin)

| Label | Value | Units | Item | LAN | OS | Pin Level |
|---|---|---|---|---|---|---|
| Chiller 1 | wait | | D1 | 84 | 18 | 0 |
| AHU4 RETURN FAN | wait | | D7 | 84 | 14 | 0 |

102 — Obtain BMS point list
104 — Model of BMS
4. IF PL contains string "metasys" THEN BMSmodel:= metasys

FIG. 4

Result extract for our example BMS point list:

NAE1 -> DX-24
NAE14 -> DX-1
NAE14 -> DX-80
NAE15 -> DX-20
NAE15 -> DX-25

CONFIGURING BUILDING ENERGY MANAGEMENT SYSTEMS USING KNOWLEDGE ENCODED IN BUILDING MANAGEMENT SYSTEM POINTS LISTS

FIELD OF THE INVENTION

The present invention relates to automatic (or semi-automatic) configuration of a Building Energy Management System (BEMS) and more particularly, to techniques for configuring a BEMS using knowledge encoded in BMS point lists.

BACKGROUND OF THE INVENTION

The detection of energy waste that can result from operational faults (for example if a room is heated and cooled simultaneously) or from faults of heating, ventilation, or air-conditioning (HVAC) equipment can translate into a significant energy savings especially if these faults are detected right away. For example, an estimated 15% to 30% of energy could be saved if faults in the HVAC system and its operation could be detected in a timely manner. See, for example, Q. Zhou et al., "A Model-Based Fault Detection and Diagnosis Strategy for HVAC Systems," International Journal of Energy Research, 33(10):903-918 (2009).

Currently, the configuration of a Building Energy Management System (BEMS) is a manual process. Efforts have been made to automate the process. See, for example, U.S. Patent Application Publication Number 2011/0055748, filed by Vacariuc, entitled "Systems and Methods for Mapping Building Management System Inputs" (hereinafter "U.S. Patent Application Publication Number 2011/0055748"). U.S. Patent Application Publication Number 2011/0055748 provides a process for semi-automatically linking data points of a Building Management System (BMS) to energy assets (such as air handling units, boilers, and chillers).

There are however some notable drawbacks to the method of U.S. Patent Application Publication Number 2011/0055748. Namely, the linkage between BMS data points and energy assets is not sufficient for configuring BEMS automatically, because the process requires local knowledge of what energy assets are available in the building. The automatic component of the process consists simply of a string matching approach which is of limited value, and the process is not fully automatic and does require user input.

Thus, fully automated techniques for configuring a BEMS that overcomes the above-described issues associated with known solutions would be desirable.

SUMMARY OF THE INVENTION

The present invention relates to techniques for configuring a Building Energy Management System (BEMS) using knowledge encoded in BMS point lists. In one aspect of the invention, a method for configuring a BEMS of a site is provided. The method includes the following steps. A knowledge base is derived from subject matter expertise. The knowledge base is used to extract one or more building characteristics from a point list of a building management system (BMS) that are not directly available from the BMS point list. The BEMS is configured using the one or more building characteristics extracted from the BMS point list.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for configuring a Building Energy Management System (BEMS) fully automatically (or semi-automatically) based on a Building Management System (BMS) point list (PL). It is notable that even if the BMS point list does not allow the BEMS configuration fully automatically the present techniques may be used to configure the BEMS semi-automatically, i.e., reducing the amount of required manual effort significantly, e.g., to 5%.

A point list (PL) contains a list of control points related to a control operation (e.g., sensing, controlling, etc.). The point list basically specifies the input and output points for a task. With large BMSs, the PL can be quite large. For instance, in a BMS of a large building, multiple controllers may be employed to control multiple energy assets—see, for example, U.S. Patent Application Publication Number 2011/0055748—and a PL might be associated with each of the controllers. Thus the PLs can end up being quite extensive. No conventional approaches exist that fully automatically configure (parts) of the BEMS.

In general, the present techniques involve capturing generic domain knowledge in an entity relationship knowledge base and exploiting this entity relationship knowledge base for automatically configuring a BEMS based on a Building Management System (BMS) point list (PL) for a particular site/location. As will be described in detail below, by way of example only, the present techniques are performed to configure one or more rules for the BEMS. One exemplary embodiment for achieving this goal is illustrated generally in FIG. 1.

Figure 2:
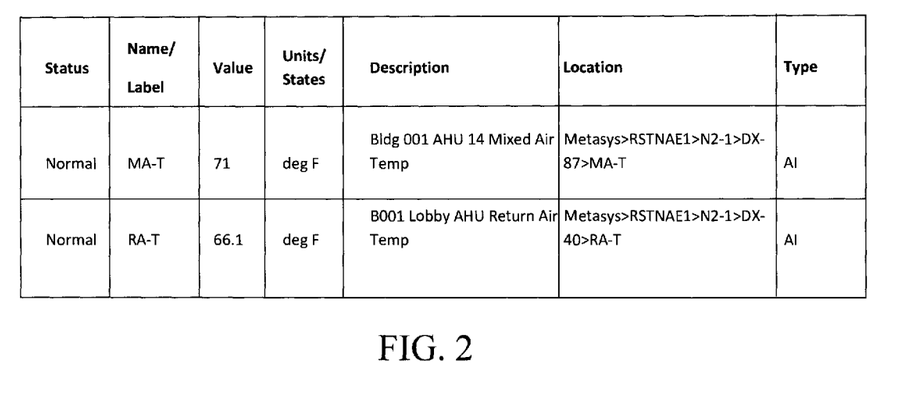
FIG. 2 is a diagram illustrating an exemplary BMS point list according to an embodiment of the present invention.

The starting point of the process is a point list (PL). Thus in step 100 one or more point lists (PLs) for the site are obtained. An example of a Metasys® BMS point list is shown in FIG. 2. Some of the fields shown (such as the Status field), are unique to a Metasys® BMS point list and are being shown merely as an example. As shown in FIG. 2, the PL entries in this example each contain a Status field (e.g., Normal, Alarm, etc.), a Name/Label field (e.g., Mixed Air Temperature (MA-T), Return Air Temperature (MA-T), etc.), a Value and a Units/States field (e.g., 71 degrees Fahrenheit (° F.), a Description field (e.g., building 001, Air Handling Unit (AHU) 14, etc.), a Location field (e.g., DX-87>MA-T), and a Type field (e.g., AI—analog input). It is to be understood that the point list shown in FIG. 2 is only an example, and that the present techniques can operate with other types/configurations of BMS point lists.

In step 102, a knowledge base is derived from subject matter expertise. By way of example only, a user (such as a building manager) might be queried as to the relationship of certain energy assets in the site (i.e., building, energy asset class, or type within an asset class). The term "asset class" refers for example to boilers, air handling units (AHUs), etc. The term "type within asset class" refers for example to Boiler Type—gas fired, oil fired, AHU type—single deck, dual deck, etc.

The following are examples of how the knowledge base is derived from subject matter expertise:

EXAMPLE 1

We use the fact that all BMS's follow a distributed network design, i.e., all devices are controlled locally via a series of distributed input/output controllers located close to the energy asset. This allows us to exploit this clustering effect to uniquely identify energy assets within specific locations within a site.

EXAMPLE 2

We use the fact that certain energy assets will always have specific control points present to control the asset- therefore we can prepare a series of signature templates for each energy asset type that we can search for within the PL to establish the presence of the asset type within the site.

The knowledge base may be expressed as a series of rules that will be employed to extract information (i.e., building characteristics) from a BMS PL, see below. It is notable that the information extracted from the BMS PL using the present techniques is information that is not directly available from the BMS PL. The term "directly available" means information that is listed explicitly in any of the columns of the PL like the unit value. See, for example, the PL in FIG. 2 where the unit values are given explicitly in the PL. By comparison, the present techniques can be used to extract information that is not specifically listed in the BMS PL. By way of example only, building characteristics might include, but are not limited to, building energy characteristics energy asset types and sub-types, etc.

Starting from the point list of the BMS and the knowledge base one or more building characteristics are extracted. To begin the data extraction process, in step 104, the model of the BMS network is identified by extracting from the point list terms that are unique to a given BMS type. The term "model," as used herein simply refers to the type of BMS (e.g., Metasys®, TransIQ®, etc). If, for example, a data dump from the Metasys® BMS is generated, then the BMS model of that point list is Metasys®.

In step 106, a list of the energy assets in the building is created and the (logical address) location of each of the energy assets in the logical BMS network is determined. For each BMS type (see description of step 110, below) information of how to extract the logical location of energy assets is provided in the knowledge base. It is independent of the type and number of energy assets.

Given the energy assets and their logical locations in the network, next in step 108 data labels are retrieved for each of the energy assets. This information can be extracted from the point list (PL).

In step 110, a determination is made as to the specific types (kinds) of the energy assets in the building and their number, e.g., how many air handling units of which type exist in the site. By performing the above-described steps to identify the specific types of the energy assets at the site the BMS data points can be linked to the specific inputs needed by the BEMS. This permits configuration of BEMS rules for the site in step 112. Again this step involves using the knowledge base to extract building characteristics (in this case data related to the specific kind/types and number of the energy assets on the site)—these characteristics which are not directly available from the point list (PL).

Each of the above-described steps is now further described in detail by way of reference to an exemplary, non-limiting example involving the configuration of rules for a BEMS. While the following example relates to the configuration of rules for a BEMS, the same principles and steps would generally apply to the configuration of any other relevant building control system (e.g., fire safety control system, building access system, etc.).

In the following example, the present techniques are employed to automatically configure a BEMS rule "Trigger alert if heating and cooling occur simultaneously" based on a BMS point list. The extract of the knowledge base that is needed to configure this rule automatically based on the BMS point list (PL) is given as follows:

1. IF PL contains string "metasys" THEN BMSmodel:= metasys
2. IF BMSmodel=metasys THEN a unique location LOC is characterized by the unique pair of ("NAE", "DX")
3. IF for a location LOC the set of labels contains "CLG-VLV" and "HTG-VLV" and none of the labels "HD-T", "CD-T", "MA-T", and "COIL-T" THEN assetType (NAE, DX):=SDVATF
4. IF assetType(LOC)=SDVATF THEN configure ruleSimultaneousHeatingAndCooling((LOC, CLG-VLV), (LOC, HTG-VLV))

Figure 1:
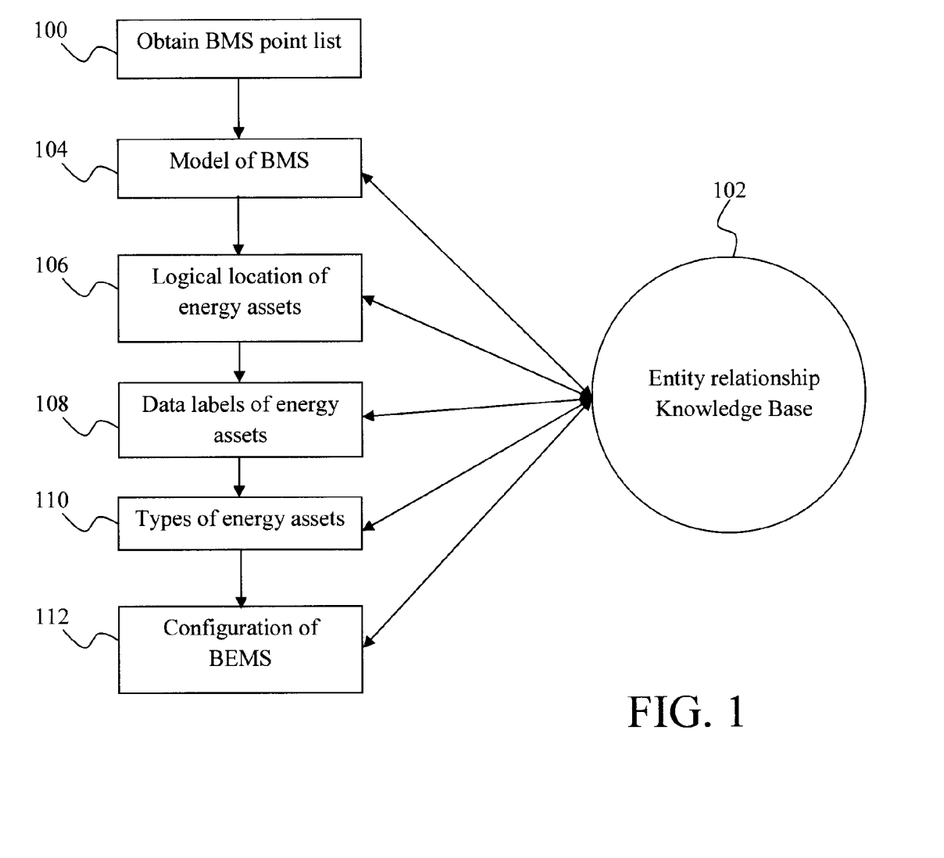
FIG. 1 is a schematic diagram illustrating an exemplary methodology for capturing generic domain knowledge in an entity relationship knowledge base and exploiting this entity relationship knowledge base for automatically configuring a Building Energy Management System (BEMS) based on a Building Management System (BMS) point list according to an embodiment of the present invention.
Figure 3:
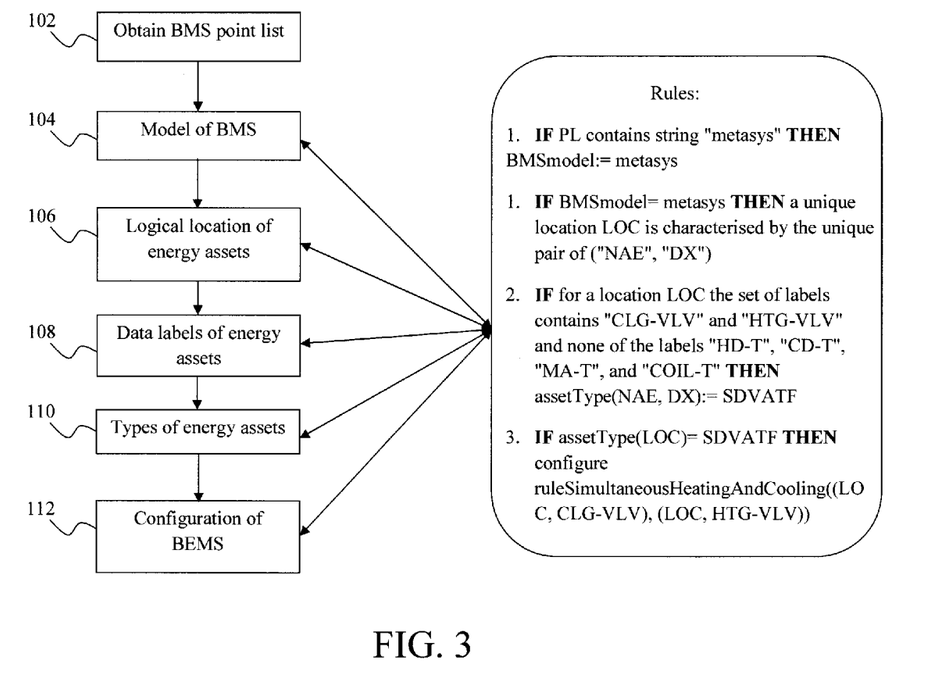
FIG. 3 is a diagram illustrating the steps of the methodology of FIG. 1, with the knowledge base needed in an exemplary scenario to configure the BEMS rule "Trigger alert if heating and cooling occur simultaneously" based on the BMS point list (PL) for a site according to an embodiment of the present invention.

See, for example, FIG. 3 which illustrates the methodology of FIG. 1 (described above), with the knowledge base needed in this particular example to configure the BEMS rule "Trigger alert if heating and cooling occur simultaneously" based on the BMS point list (PL). As shown in FIG. 3, based on the given point list (PL) and knowledge base (rules 1-4), the steps 104-112 can be performed to configure rules for the BEMS. Each of the steps will now be described in detail in the context of this present example.

Figure 4:
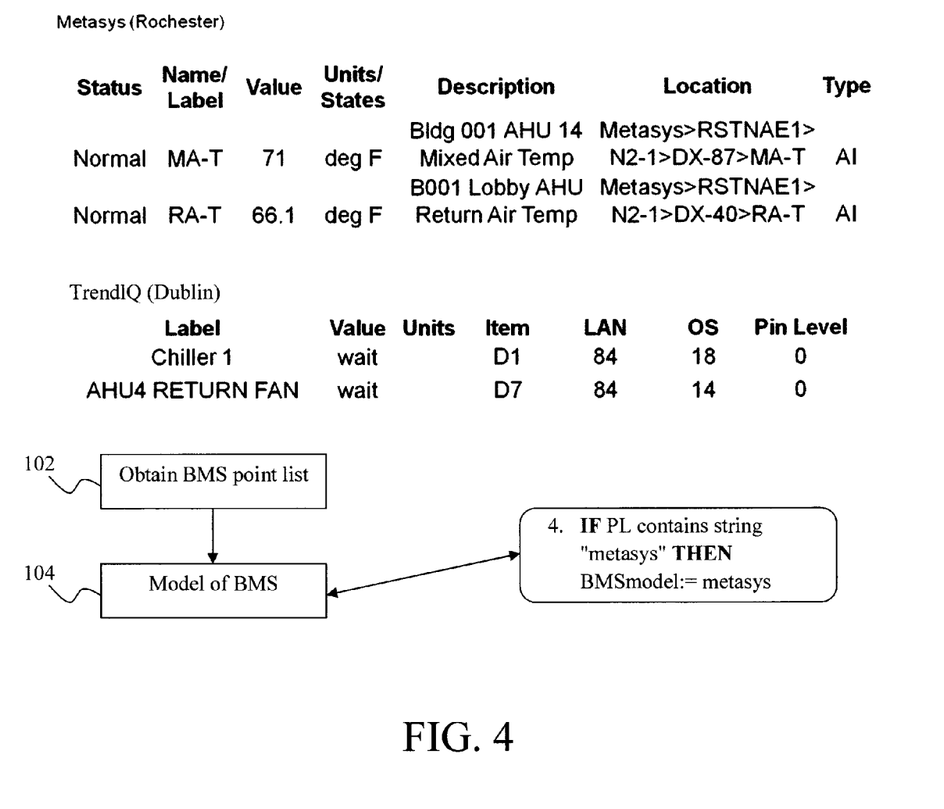
FIG. 4 is a schematic diagram illustrating the step of modeling the BMS in the exemplary scenario of FIG. 3 according to an embodiment of the present invention.

First, using rule 1 from the knowledge base, string matching is used to identify the type of BMS of the PL. This determines how searching is done for all data points of a unique energy asset. See FIG. 4 which illustrates schematically step 104 being performed in this exemplary scenario to model the BMS. As provided above, the knowledge base rule 1 states that IF PL contains string "metasys" THEN BMSmodel:=metasys. As shown in FIG. 4, two point lists are provided, one labeled "Metasys (Rochester)" and the other "TrendIQ (Dublin)." The points list references are generated from Metasys® and TrendIQ® two of many commercially available Building Management Systems that are used in industry to manage building operations primarily in the area of air conditioning provisioning. In this particular example, rule 1 dictates selection of the Metasys BMS point list (PL). For instance, each building is managed by a single BMS. BMSs can have different types, like Metasys® or TrendIQ®. Thus, given a PL one first needs to identify which BMS type is used. As provided above, knowing the type of BMS of the point list (here Metasys) is needed in order to determine how data points of the energy assets in the suite are searched. It is notable that further iterations of the method may be conducted with the TrendIQ BMS if so desired, and the use of the Metasys BMS in this example is merely arbitrary.

Next, in the case of the Metasys® BMS all data points (from the PL) are associated to a unique set of identifiers which denote their unique location in the logical BMS network (rule 2). In the present Metasys® example, a pair of unique Network Automation Engine (NAE) and DX identifiers denotes the unique location of the energy assets in the logical BMS network. However, any other suitable identifiers may be employed in the same manner so long as they uniquely identify the (logical address) location of each of the energy assets in the logical network.

Figure 5:
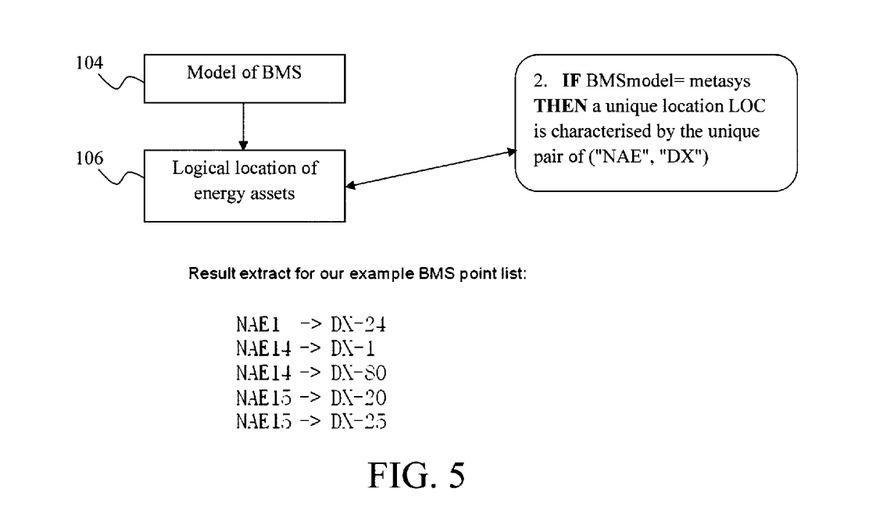
FIG. 5 is a schematic diagram illustrating the step of determining the logical location of the energy assets in the BMS network in the exemplary scenario of FIG. 3 according to an embodiment of the present invention.

See FIG. 5 which illustrates schematically step 106 being performed in this exemplary scenario to determine the logical location of the energy assets in the BMS network. As shown in FIG. 5, in this example a unique location (LOC) of each energy asset is denoted by a pair of unique (NAE and DX). In this case, the result is five pairs of NAE, DX identifiers representing the location of five different and unique energy assets in the BMS network. Specifically a search is made for all data points that contain the strings "NAE" followed by at least one digit AND "DX" followed by at least one digit to obtain the unique locations for the example PL:

NAE1 -> DX-24
NAE14 -> DX-1
NAE14 -> DX-80
NAE15 -> DX-20
NAE15 -> DX-25.

Figure 6:
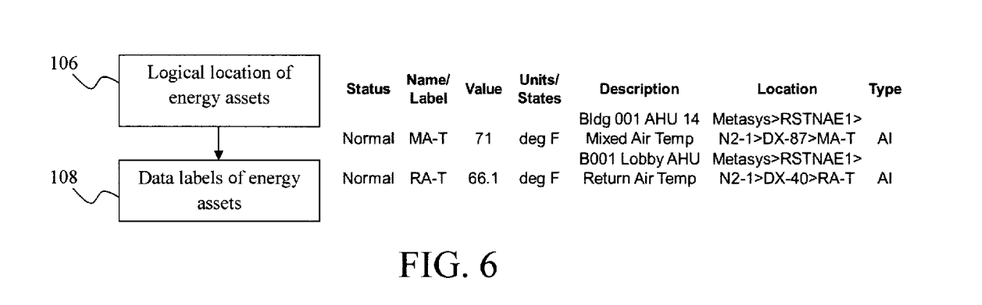
FIG. 6 is a schematic diagram illustrating the step of extracting the data labels of the energy assets in the BMS network in the exemplary scenario of FIG. 3 according to an embodiment of the present invention.

Next, all data labels of a unique location are retrieved. See FIG. 6 which illustrates schematically step 108 being performed in this exemplary scenario to extract the data labels of the energy assets in the BMS network. In this particular example, the following labels were extracted for the unique locations shown immediately above (and in FIG. 5):

NAE1 -> DX-24 -> CLG-VLV
NAE1 -> DX-24 -> DA-H
NAE1 -> DX-24 -> DA-T
NAE1 -> DX-24 -> DX-TRBL
NAE1 -> DX-24 -> HTG-VLV
NAE1 -> DX-24 -> HUM-VLV
NAE1 -> DX-24 -> MA-T

-continued

NAE1 -> DX-24 -> OA-DPR
NAE1 -> DX-24 -> PH-T
NAE1 -> DX-24 -> SF-O
NAE1 -> DX-24 -> SF-S
NAE1 -> DX-24 -> ZN-T
NAE14 -> DX-1 -> CLG-VLV
NAE14 -> DX-1 -> HTG-VLV
NAE14 -> DX-1 -> HUM-VLV
NAE14 -> DX-1 -> PH-T
NAE14 -> DX-1 -> SF-O
NAE14 -> DX-1 -> SF-S
NAE14 -> DX-1 -> ZN-H
NAE14 -> DX-80 -> CLG-VLV
NAE14 -> DX-80 -> DA-H
NAE14 -> DX-80 -> DA-T
NAE14 -> DX-80 -> HTG-VLV
NAE14 -> DX-80 -> HUM-VLV
NAE14 -> DX-80 -> PH-T
NAE14 -> DX-80 -> SF-O
NAE14 -> DX-80 -> ZN-H
NAE15 -> DX-20 -> CLG-VLV
NAE15 -> DX-20 -> DA-H
NAE15 -> DX-20 -> DA-T
NAE15 -> DX-20 -> HTG-VLV
NAE15 -> DX-20 -> HUM-JCKT
NAE15 -> DX-20 -> HUM-VLV
NAE15 -> DX-20 -> OA-DPR
NAE15 -> DX-20 -> SA-P
NAE15 -> DX-20 -> SF-O
NAE15 -> DX-20 -> SF-S
NAE15 -> DX-20 -> ZN-H
NAE15 -> DX-20 -> ZN-T

Figure 7:
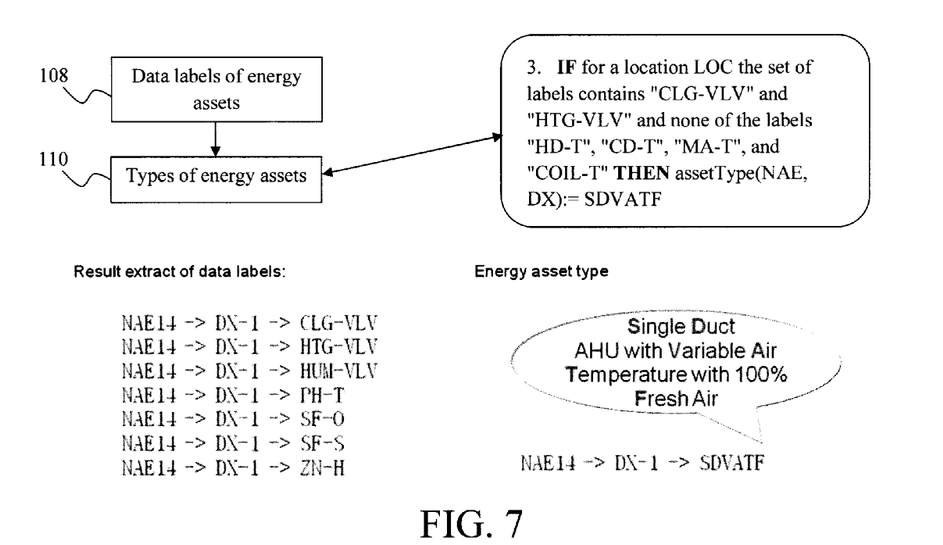
FIG. 7 is a schematic diagram illustrating the step of determining the types of energy assets from the extracted data labels in the exemplary scenario of FIG. 3 according to an embodiment of the present invention.

Given the labels of the unique assets, the asset type is then determined. See FIG. 7 which illustrates schematically step 110 being performed in this exemplary scenario to determine the types of energy assets from the extracted data labels. By way of example only, as shown in FIG. 6, if data points labeled "CLG-VLV" and "HTG-VLV" are present but none of the labels "HD-T," "CD-T," "MA-T," and "COIL-T" then the asset type of that location is a Single Duct Variable Temp 100% Fresh air (SDVATF) AHU (see rule 3). The asset types for the exemplary unique locations are shown as:

NAE1 -> DX-24 -> SDVATR
NAE14 -> DX-1 -> SDVATF
NAE14 -> DX-80 -> SDVATF
NAE15 -> DX-20 -> SDVATF

Figure 8:
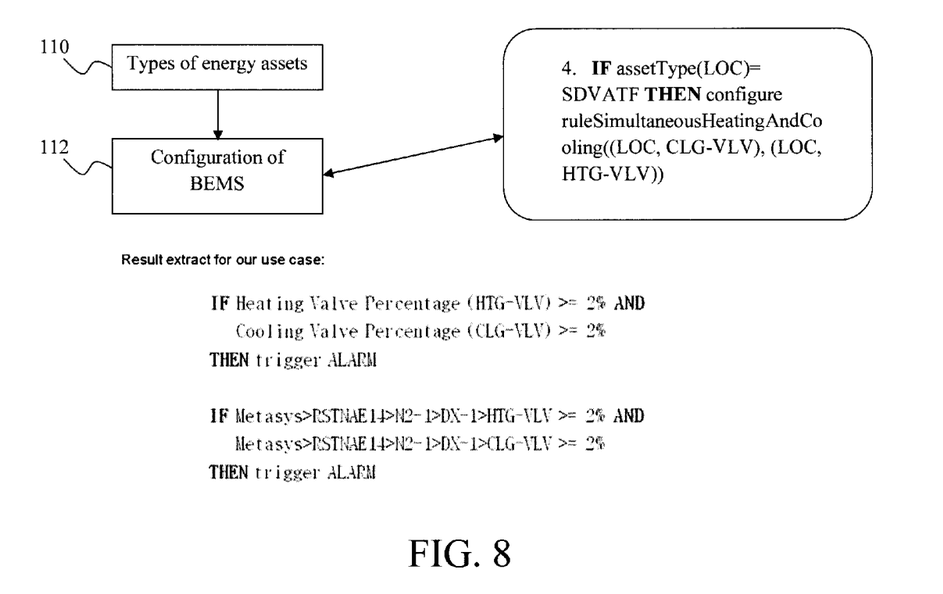
FIG. 8 is a schematic diagram illustrating the step of configuring BEMS rules for the asset types in the exemplary scenario of FIG. 3 according to an embodiment of the present invention.

Finally, the BEMS rules are configured that are applicable for the particular energy asset types. See FIG. 8 which illustrates schematically step 112 being performed in this exemplary scenario to configure BEMS rules for the asset types. For instance in this exemplary scenario, for Air Handling Units (AHUs) of type SDVATF the rule for simultaneous heating and cooling is applicable:

IF Heating Valve Percentage (HTG-VLV) >= 2% AND
  Cooling Valve Percentage (CLG-VLV) >= 2%
THEN trigger ALARM In the instant example, the following instantiations are obtained:

IF Metasys>RSTNAE14>N2-1>DX-1>HTG-VLV >= 2% AND
  Metasys>RSTNAE14>N2-1>DX-1>CLG-VLV >= 2%
THEN trigger ALARM
IF Metasys>RSTNAE14>N2-1>DX-80>HTG-VLV >= 2% AND
  Metasys>RSTNAE14>N2-1>DX-80>CLG-VLV >= 2%

-continued

```
    THEN trigger ALARM
    IF Metasys>RSTNAE15>N2-1>DX-20>HTG-VLV >= 2% AND
       Metasys>RSTNAE15>N2-1>DX-20>CLG-VLV >= 2%
    THEN trigger ALARM
```

Figure 9:
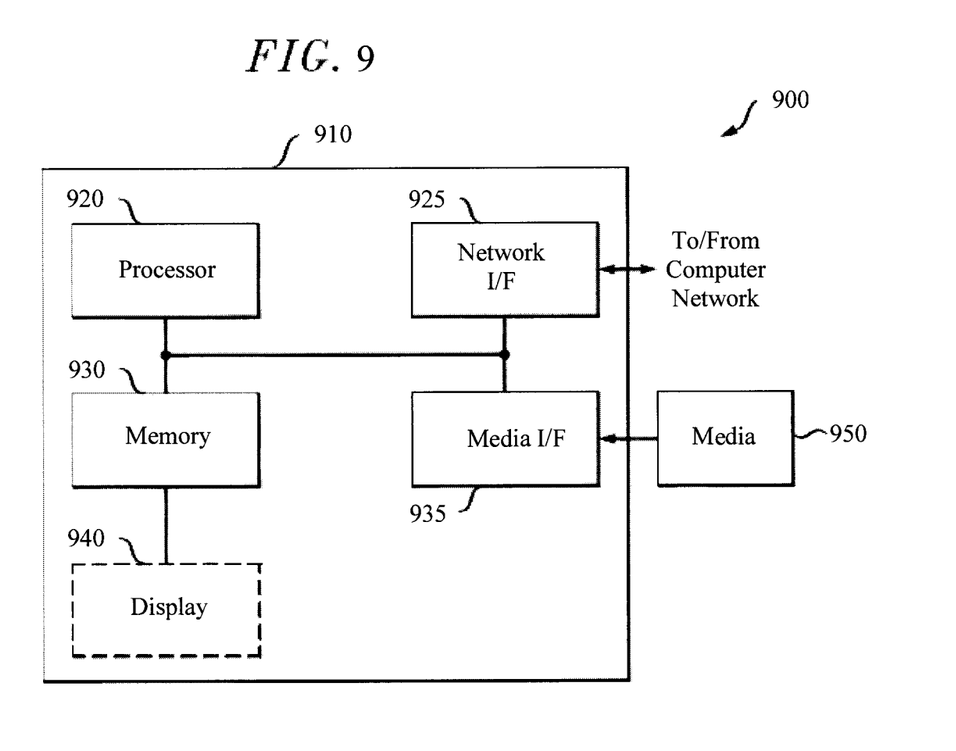
FIG. 9 is a diagram illustrating an exemplary apparatus for performing one or more of the methodologies presented herein according to an embodiment of the present invention.

Turning now to FIG. 9, a block diagram is shown of an apparatus 900 for implementing one or more of the methodologies presented herein. By way of example only, apparatus 900 can be configured to implement one or more of the steps of the methodology of FIG. 1 for configuring a BEMS of a site.

Apparatus 900 includes a computer system 910 and removable media 950. Computer system 910 includes a processor device 920, a network interface 925, a memory 930, a media interface 935 and an optional display 940. Network interface 925 allows computer system 910 to connect to a network, while media interface 935 allows computer system 910 to interact with media, such as a hard drive or removable media 950.

As is known in the art, the methods and apparatus discussed herein may be distributed as an article of manufacture that itself comprises a machine-readable medium containing one or more programs which when executed implement embodiments of the present invention. For instance, when apparatus 900 is configured to implement one or more of the steps of the methodology of FIG. 1 the machine-readable medium may contain a program configured to derive a knowledge base from subject matter expertise; use the knowledge base to extract one or more building characteristics from a point list of a building management system (BMS) that are not directly available from the BMS point list; and configure the BEMS using the one or more building characteristics extracted from the BMS point list.

The machine-readable medium may be a recordable medium (e.g., floppy disks, hard drive, optical disks such as removable media 950, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 920 can be configured to implement the methods, steps, and functions disclosed herein. The memory 930 could be distributed or local and the processor device 920 could be distributed or singular. The memory 930 could be implemented as an electrical, magnetic or optical memory, or any combination of these or other types of storage devices. Moreover, the term "memory" should be construed broadly enough to encompass any information able to be read from, or written to, an address in the addressable space accessed by processor device 920. With this definition, information on a network, accessible through network interface 925, is still within memory 930 because the processor device 920 can retrieve the information from the network. It should be noted that each distributed processor that makes up processor device 920 generally contains its own addressable memory space. It should also be noted that some or all of computer system 910 can be incorporated into an application-specific or general-use integrated circuit.

Optional display 940 is any type of display suitable for interacting with a human user of apparatus 900. Generally, display 940 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for configuring a building energy management system (BEMS) of a site, the method comprising the steps of:
    obtaining information from a user about energy assets in the site, wherein the information identifies control points for energy asset types;
    deriving a knowledge base from the information by using the control points identified for the energy asset types to prepare control point signature templates for each of the energy asset types;
    using the knowledge base to extract one or more building characteristics from a point list of a building management system (BMS) that are not directly available from the BMS point list by searching the BMS point list using the control point signature templates for each of the energy asset types to establish a presence of the energy assets within the site, wherein the presence of the energy assets within the site is not directly available from the BMS point list;
    automatically configuring the BEMS using the one or more building characteristics extracted from the BMS point list; and
    using the BEMS to manage the energy assets at the site.

2. The method of claim 1, further comprising the step of:
    querying the user for the information.

3. The method of claim 1, wherein the one or more building characteristics are used to generate one or more rules for the BEMS.

4. The method of claim 1, wherein the one or more building characteristics extracted from the point list comprises data relating to a physical and a logical network of the site.

5. The method of claim 1, further comprising the step of:
    identifying a model of the BMS using terms that are unique to BMS types.

6. The method of claim 1, wherein the one or more building characteristics extracted from the point list comprises data related to kinds and numbers of the energy assets on the site.

7. The method of claim 6, further comprising the step of:
    determining a logical location of the energy assets in a logical network of the site from the knowledge base.

8. The method of claim 6, further comprising the step of:
    retrieving data labels for each of the energy assets on the site from the point list.

9. The method of claim 1, wherein the one or more building characteristics extracted from the point list comprises data related to what specific types of energy assets are on the site.

10. The method of claim 1, wherein the user is a building manager.

* * * * *